June 14, 1932.  O. E. SWEARINGEN  1,862,611
HAND REEL
Filed Nov. 19, 1929  3 Sheets-Sheet 3
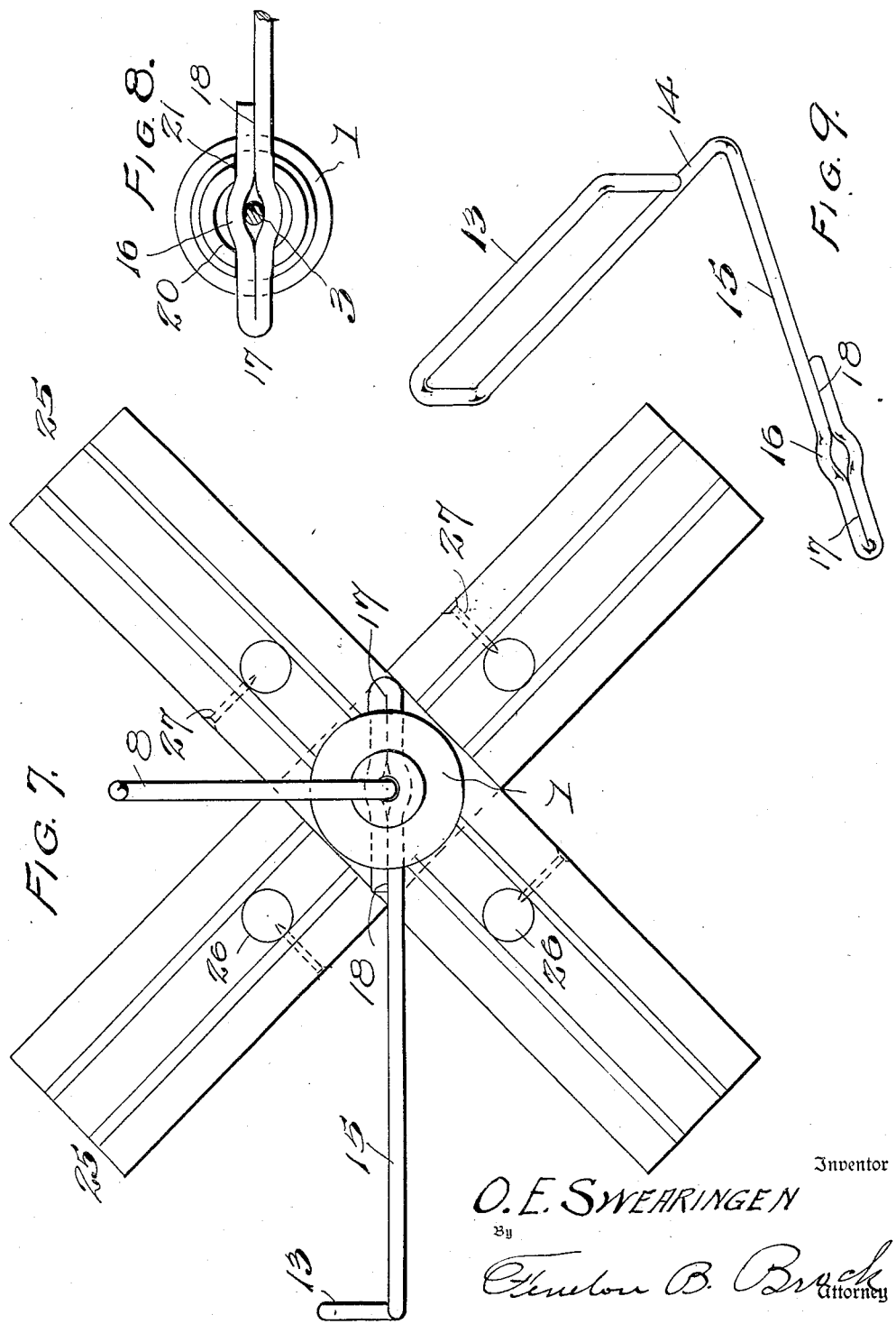
Inventor
O. E. SWEARINGEN Patented June 14, 1932

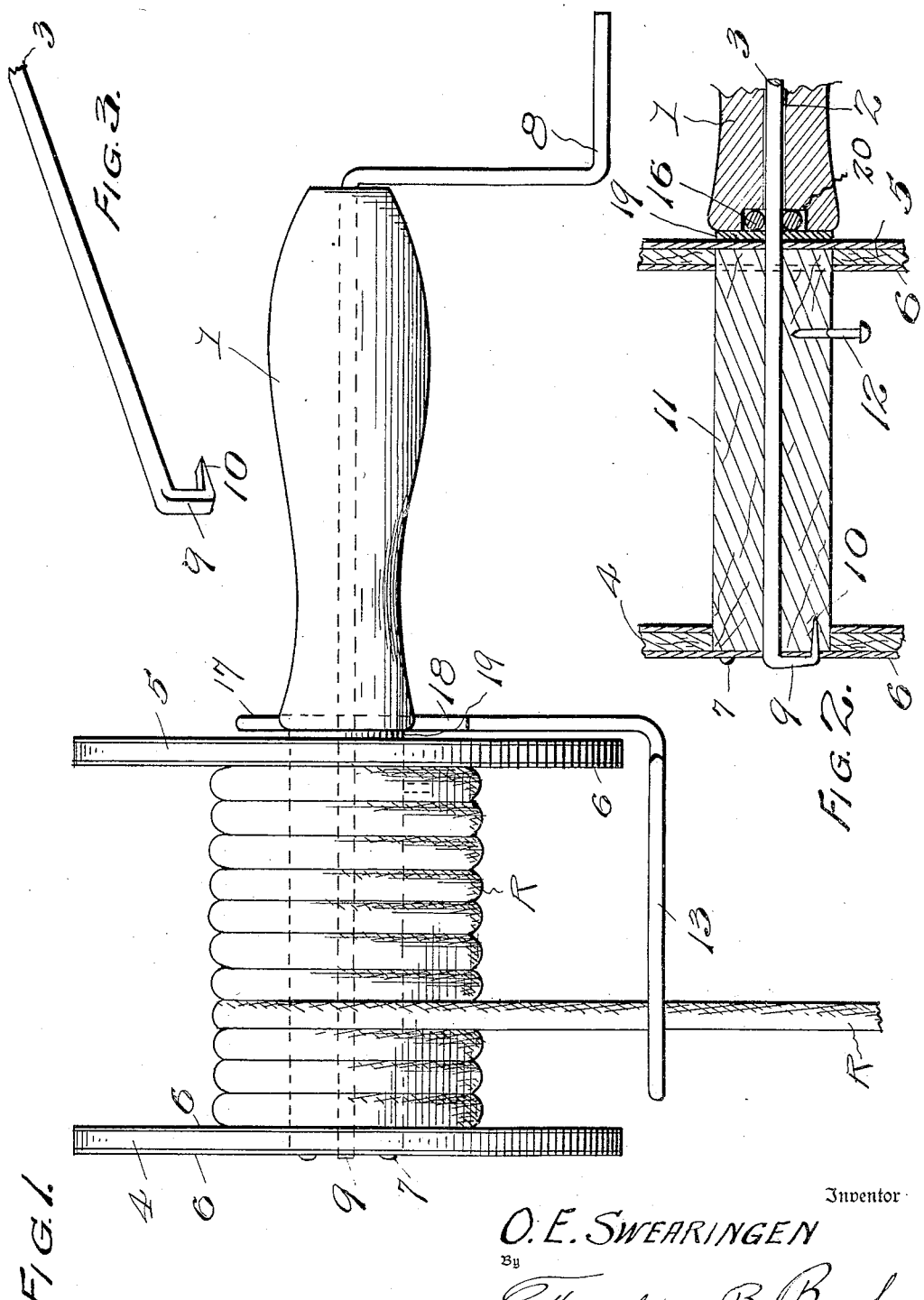

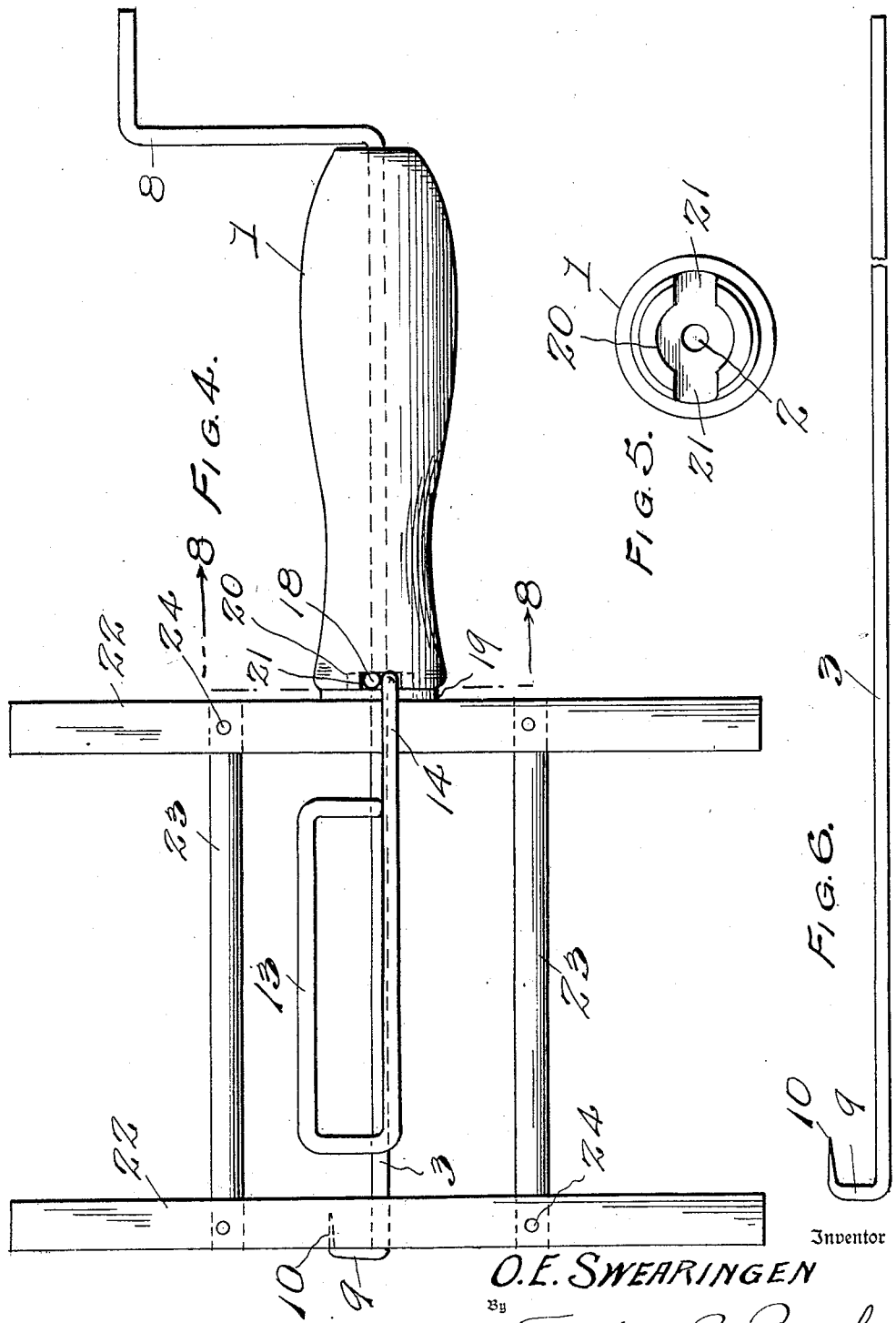

1,862,611

UNITED STATES PATENT OFFICE

OSCAR E. SWEARINGEN, OF MATTOON, ILLINOIS

HAND REEL

Application filed November 19, 1929. Serial No. 408,278.

My present invention relates to improvements in hand reels designed for use in winding or reeling, and unwinding rope, clothes lines, trout lines, and chalk lines as used by carpenters, brick masons, concrete men and others. The primary object of my invention is the provision of a device of this character that may be manufactured at comparatively low cost and with a minimum number of parts; which is rugged and durable, and designed to withstand hard usage; and which is simple in construction and operation. The reel is of the type which is employed by holding a handle in one hand and operating a crank shaft with the other hand for reeling or winding a rope, cord, wire, or other commodities, and also of course permitting the rope to be unwound.

My invention consists in certain novel constructions, combinations and arrangements of parts involving the general assembling of the rotary reel, crank shaft, handle and rope guide, as will hereinafter be more fully set forth and claimed.

In the accompanying drawings I have illustrated one complete example of the combination and arrangement of parts of my invention according to the best mode I have so far designed for the practical application of the principles of the invention, three different types of reels being illustrated for the physical embodiment of the invention.

Figure 1 is a top plan view of a hand operated winding reel of the disk type embodying my invention. Figure 2 is a longitudinal sectional detail view of part of the device of Figure 1. Figure 3 is a perspective view at the attaching end of the crank shaft. Figure 4 is a face view of a reel of the single section slat type embodying my invention. Figure 5 is an end view of the wooden handle. Figure 6 is a view showing the shaft before being bent to form the crank handle. Figure 7 is an end view of a double slat type of reel embodying my invention. Figure 8 is a detail view at line 8—8 of Figure 4. Figure 9 is a perspective view of the guide loop and its supporting arm or frame.

In the preferred form of my invention as shown in Figure 1, I illustrate a disk type of reel with which the handle 1 is employed. The handle as shown is fashioned from wood and is provided with a central longitudinal bore 2 in which the crank shaft 3 is journaled to revolve. The disk type of reel comprises two disks as 4 and 5 which in this instance are made with veneer faces as 6 that are secured by nails or tacks 7 to provide a finished appearance for the rotary reel.

The shaft 3 is journaled in the handle 1 and the shaft is provided with a crank handle 8 at one end while at the opposite end of the shaft the latter is fashioned with an angular head 9 that terminates in a sharpened stud or prong 10. The shaft is inserted in the handle 1 before the crank handle 8 is fashioned and the sharpened stud 10 is used to rigidly attach the shaft to the spool or barrel portion 11 of the reel. The shaft is passed through the barrel portion 11 of the reel and then through the handle 1, after which the crank handle 8 is fashioned on the shaft. As seen in Figure 2 the spike or sharpened stud 10 is driven into the end of the barrel 11 and in this manner the shaft and the reel are rigidly joined in order that the reel may be revolved by turning the crank handle 8 with the shaft journaled in the handle 1.

The barrel 11 of the spool is provided with a nail 12 and one end of the rope R is attached to this nail for anchoring the rope which may be a clothesline to the reel.

In Figure 1 it will be apparent that the reel may be supported by holding the handle 1 in the left hand, then by turning the crank handle 8 with the right hand in a clockwise manner, the rope R is wound upon the reel.

It will be seen that the rope R passes through a loop 13 which guides the rope as it is laid or wound upon the reel, and this rope guide 13 is supported in rigid relation to the wood handle 1.

As best seen in Figure 9 the loop 13 is part of an integral frame which is preferably made of a single piece of suitable wire and provided with right angle arms 14 and 15, the arm 14 being bent to form the rectangular guide loop 13. The arm 15 is fashioned with an eye 16 that fits over the shaft 3 as seen in Figures 2 and 8. This eye is formed by bending or folding the end of the arm 15 and the arm 15 is thus doubly reinforced at 17 and 18. Thus the arm 15 is fashioned with lock bars 17 and 18 by means of which the frame of the guide loop is rigidly joined to the wood handle 1, and a metal washer 19 is located between the reel and the handle as shown in Figures 1 and 2.

The cross bars 17 and 18 are locked to the wood handle 1 by means of a circular recess 20 and diametrically arranged notches 21, 21, in the inner end of the wood handle 1. The circular recess 20 is adapted to receive the eye 16 of the guide loop frame and the two notches 21, 21, receive the two lock bars 17 and 18 and the guide frame is locked rigidly to the handle 1 while permitting the shaft 3 to turn therein.

After the handle 1 has been pushed against the washer 19 the crank handle 8 is bent at the end of the shaft 1 and in this manner longitudinal movement of the handle 1 on the shaft is prevented. In this simple manner and by this simple combination and arrangement of parts the stationary handle 1 and the rotary reel are held together and the guide loop frame is secured in the handle 1 to guide the rope to and from the reel as the latter is rotated by the crank handle 8.

In Figure 4 I have shown a single slat type of reel comprising spaced slats 22, 22, that are joined by dowel pins 23, and nails or sprigs 24 are used to secure the slats and the dowel pins. The shaft 3 passes through the spaced slats 22 and the spike or sharpened stud 10 is driven in the outer one of the two slats. The washer 19 is used at the opposite end of the reel between the slat 22 and the handle 1. The operation of this type of reel is similar to that of Figure 1. In Figure 7 a double slat type of reel is shown comprising spaced pairs of crossed slats 25, 25, which are joined by dowel pins 26, and the pins and slats are secured by nails or sprigs 27. This type of reel is also operated by holding the handle 1 in the left hand and turning the crank handle 8 by the right hand as in the parts of the reels shown in Figures 1 and 4.

It will be noted that the loop or wire guide 13 is held across the reel in such manner as to lay the rope in correct position upon the reel without tangling the rope, and of course the rope as it unwinds is guided by the loop so that the operator is not required to closely watch the winding or unwinding of the rope.

It will be understood that other materials than those shown and mentioned may be utilized, as for instance the disks may be made of metal, pressed wood, beaver board, etc., the size of the reels may be varied, and other changes and alterations may be made in my exemplified invention within the scope of my appended claims without departing from the principles of my invention.

Having thus fully described my invention what I claim as new and desire to secure by Letters Patent is:

1. The combination with a reel and its crank shaft, and a handle in which the shaft is journaled, of a rope guide comprising angular arms one of which is formed with a guide loop, parallel-locking bars having spread portions to form an eye in the other arm for co-action with the handle and shaft, and a crank handle formed at one end of the shaft.

2. In a hand reel, the combination with a tubular handle, of a rotatable shaft journaled in the handle, said shaft having an integral crank handle at one end of the handle, a reel mounted on the shaft at the other end of the handle, an integral return bend on the shaft forming an attaching head secured to the reel, and a rope guide mounted on the handle adjacent the reel and projecting into operative relation to the reel.

OSCAR E. SWEARINGEN.